Patented Apr. 2, 1940

2,196,128

UNITED STATES PATENT OFFICE 2,196,128

COATING AND IMPREGNATING COMPOSITION AND METHOD OF COATING SURFACES

Albert Henry Stuart, Walthamstow, England, assignor, by mesne assignments, to Acheson Colloids Corporation, New York, N. Y., a corporation of New York No Drawing. Application August 29, 1936, Serial No. 98,597. In Great Britain March 27, 1936

13 Claims. (Cl. 134—1)

This invention relates to a method of coating and impregnating materials and to novel compositions for providing resistant coatings on materials of various kinds.

A principal object of the invention is the provision on materials and articles of coatings which are adherent, nonhygroscopic, and resistant to water, heat and corrosion.

A further object is the provision of electrically conducting coating of high stability.

A further object is the provision of heat conductive coating of high resistance to heat, water and corrosion.

Another object is the production of stable coatings having lubricating properties.

It has been found that these and other desirable objects may be attained by covering the article or material to be coated with an aqueous composition containing a hardenable organic colloid such as glue or gelatin, a hardening agent for the organic colloid and a finely divided colloidal or foliaceous material, particularly colloidal or semi-colloidal graphite. For certain purposes the properties of the compositions may be advantageously modified by the addition of other materials, for example, fillers, such as zinc oxide.

Desirable hardening agents for the organic colloid are provided, for example, by such substances as potassium bichromate, which cause gelatin and glue to become indurated on exposure to light.

A typical example of the compositions of the invention comprises 0.25% by weight of gelatin, 0.0025% by weight of potassium bichromate and 4.5% by weight of colloidal graphite. A convenient method of preparing such a composition is afforded by making up a solution containing, for example, 1% by weight of gelatin and 0.01% by weight of potassium bichromate in distilled water. To this solution is added a suitable quantity of colloidal graphite. For example, to one part of the gelatin-bichromate solution is added about 0.82 parts of a colloidal suspension of graphite in water sold under the trade-mark "Aquadag" and containing 22% by weight of colloidal graphite. This mixture is then made up to four parts by the addition of distilled water.

Colloidal carbon, powdered graphite, semi-colloidal graphite, metallic colloids and other colloidal or finely divided foliaceous material may be used in addition to or in substitution for the colloidal graphite.

The amounts of organic colloid, hardening agent, foliaceous material and other added materials may be varied within considerable limits depending on the use to which the composition is to be put.

In using the compositions of the invention, they are applied to the surface to be coated in any desired way, as by dipping, brushing, spraying, or the like. The coating is then allowed to dry and is hardened. If the particular composition described above by way of example is used, it is hardened by exposure to light either artificial or nataural. It is, of course, desirable that the surfaces to be coated be thoroughly cleaned and freed from grease before applying the coating composition.

The method and compositions of the invention have many valuable uses of which the following are illustrative examples:

(a) Electrical resistance elements may be manufactured by applying one or more coats of the composition to a paper or other suitable base.

(b) Electrically non-conducting materials, such as wood, ebonite, molding of phenol condensation products, known by the trade-mark "Bakelite", for example, and the like, may be prepared for electroplating by being coated with the composition. Such a coating is not affected by copper sulphate or cyanide solutions and has proved suitable for the electrodeposition of copper, for example.

(c) Portions of the surfaces of electrical insulators, for example, suspension insulators or pin type insulators, may be coated with the composition where, otherwise metallized surfaces would be used.

Applications in which principally the corrosion resisting qualities of the composition are utilized are as follows:

(d) The corrosion or furring of boilers may be prevented or minimized by coating the surfaces to be exposed to water with the composition. For iron or steel boilers beneficial effects are obtained by adding zinc oxide, for example, to the composition. The addition of this filled gives a consistency which enables the composition to be applied by spraying. As zinc is electropositive to iron, oxidation of the iron is resisted and a very efficient boiler dressing is provided. Other suitable metals are manganese, aluminium, beryllium and magnesium, and aluminium oxide, magnesium hydroxide and the like may be used in place of zinc oxide, if desired.

(e) Metals such as nickel, for example, may be coated with the composition, such a coating being resistant to mercury vapor.

(f) Silverware or wire may be coated with the composition, it being preferred to employ a filler such as referred to above in Example d. A preliminary treatment of the silver surface with ammonia solution is beneficial.

(g) Electric immersion heaters may be coated with the composition to reduce furring.

(h) Readily oxidizable metals or alloys, such as the alloy known by the trade-mark "Duralumin", for example, may be made resistant to oxidation and corrosion by coating with the composition. A particularly effective mixture comprises:

| | Per cent by weight |
|---|---|
| Colloidal graphite | 4.5 |
| Gelatine | 0.75 |
| Potassium bichromate | 0.04 | the remainder being distilled water.

Other applications of a more general nature include:

(i) Surfaces not readily capable of lubrication by ordinary means may be lubricated by the application of a coating of the composition. For example, the steel ram of a lead extruding machine may be coated with the composition for this purpose. The composition may be applied to the surface at normal temperatures or the surface may have been heated to about 100° C.

(j) The adhering of asbestos gaskets or the like to metal surfaces may be minimized by impregnating the asbestos with the composition. A solution of one-fifth of the strength of the first specified composition is more easily applied to the asbestos.

(k) Improved heat transference in the cylinder head of an internal combustion engine may be obtained by coating the interior of the head with the composition.

(l) Glass surfaces may be provided with an adherent coating by applying the composition thereto. Pre-treatment of the glass surface with ammonia is beneficial. The surface coating may be engraved to provide screens for photographic work or the like.

(m) Fabric may be made electrically conductive by saturating or impregnating it with the composition. Fabric impregnated in this manner may find application in electrostatic loud speakers, for example.

It will be seen that the invention comprises a method and composition for coating and impregnating materials which provide many novel and valuable advantages.

I claim:

1. A composition for coating and impregnating comprising a hardenable organic colloid, a hardening agent and a preponderance by weight of colloidal graphite in an aqueous medium.

2. A composition for coating and impregnating comprising gelatin, a hardening agent and a preponderance by weight of colloidal graphite in an aqueous medium.

3. A composition for coating and impregnating comprising gelatin, an agent capable of hardening gelatin on exposure to light, and a preponderance by weight of colloidal graphite in an aqueous medium.

4. A composition for coating and impregnating comprising gelatin, an alkali metal bichromate and a preponderance by weight of colloidal graphite in an aqueous medium.

5. A composition for coating and impregnating comprising gelatin, a hardening agent, colloidal graphite and zinc oxide in an aqueous medium.

6. A method of coating and impregnating material which comprises treating the material with an aqueous composition containing gelatin, an alkali metal bichromate and colloidal graphite, and drying and hardening the composition by exposure to light.

7. A coating composition comprising about 4.5% by weight of colloidal graphite, 0.75% to 1.0% by weight of a hardenable organic colloid and 0.01% to 0.04% by weight of potassium bichromate in an aqueous medium.

8. A coating composition comprising about 4.5% by weight of colloidal graphite, 0.75% to 1.0% by weight of gelatin and 0.01% to 0.04% by weight of potassium bichromate in an aqueous medium.

9. A coating composition comprising about 4.5% by weight of colloidal graphite, 0.75% to 1.0% by weight of glue and 0.01% to 0.04% by weight of potassium bichromate in an aqueous medium.

10. A coating composition for producing adherent corrosion resistant and conductive coatings comprising colloidal graphite, a hardenable organic colloid and a hardening agent in an aqueous medium, the colloidal graphite being in a preponderance by weight with respect to the colloid and hardening agent.

11. An abrasion and corrosion resistant metal coating composition comprising a preponderance of finely divided graphite, small amounts of a hardenable organic colloid binder and a hardening agent for the organic colloid in an aqueous medium.

12. An abrasion and corrosion resistant metal coating composition comprising a preponderance of finely divided graphite, and small amounts of gelatin and a hardening agent for the gelatin in an aqueous medium.

13. An abrasion and corrosion resistant metal coating composition comprising a preponderance of finely divided graphite, and small amounts of glue and a hardening agent for the glue in an aqueous medium.

ALBERT HENRY STUART.